United States Patent [19]

Aagard

[11] Patent Number: 4,651,120

[45] Date of Patent: Mar. 17, 1987

[54] PIEZORESISTIVE PRESSURE SENSOR

[75] Inventor: Roger L. Aagard, Prior Lake, Minn.

[73] Assignee: Honeywell Inc., Minneapolis, Minn.

[21] Appl. No.: 774,127

[22] Filed: Sep. 9, 1985

[51] Int. Cl.$^4$ .............................................. G01L 1/22
[52] U.S. Cl. .......................................... 338/4; 338/5; 29/610 SG
[58] Field of Search .............. 338/4, 5, 2; 29/610 SG, 29/576 B, 571; 357/26, 91

[56] References Cited

U.S. PATENT DOCUMENTS

| 3,801,949 | 4/1974 | Larrabee | 338/22 R |
|---|---|---|---|
| 3,858,150 | 12/1974 | Gurtler et al. | 338/2 |
| 4,127,840 | 11/1978 | House | 338/4 |
| 4,203,327 | 5/1980 | Singh | 338/2 |
| 4,317,126 | 2/1982 | Gragg, Jr. | 338/4 X |
| 4,456,901 | 6/1984 | Kurtz et al. | 338/5 X |
| 4,510,671 | 4/1985 | Kurtz et al. | 338/5 X |

OTHER PUBLICATIONS

Kim & Wise, "Temperature Sensitivity in Silicon Piezoresistive Pressure Transducers", IEEE Trans. on Elect. Dev., vol. ED 30, No. 7, Jul. 83, pp. 802-810.

Primary Examiner—E. A. Goldberg
Assistant Examiner—M. M. Lateef
Attorney, Agent, or Firm—Omund R. Dahle

[57] ABSTRACT

A piezoresisitve pressure sensor having a diaphragm of silicon nitride with a stressed resistor under the edge of the diaphragm in a single crystal supporting wafer. The signal is derived from the stress in the silicon where the diaphragm attaches to the edge of the opening etched through the silicon.

20 Claims, 11 Drawing Figures

PIEZORESISTIVE PRESSURE SENSOR

BACKGROUND AND SUMMARY OF THE INVENTION

The field of the invention is silicon piezoresistive pressure sensors.

Prior art silicon piezoresistive sensors are made by etching thin (one mil or greater) diaphragms into the silicon because of the large piezoresistive effect in the silicon diaphragms.

The present invention has resistors fabricated in the silicon substrate adjacent a $Si_3N_4$ diaphragm by ion implantation through the $Si_3N_4$ layer and utilizes the piezoresistive shear in the silicon substrate where the $Si_3N_4$ diaphragm is attached, so as to retain the desirable properties of single crystal silicon with non-silicon diaphragm material.

DESCRIPTION

The present invention relates to improvements in ultra small shear stress sensitive silicon piezoresistive pressure sensors. In the prior art these sensors are made by etching thin diaphragms into the silicon. They are generally limited to diameters of a millimeter or more. The present invention uses non-silicon diaphragms and utilizes the piezoresistive shear in the silicon substrate where the diaphragm attaches so as to retain the desirable properties of single crystal silicon with non-silicon diaphragm material.

Figure 1:
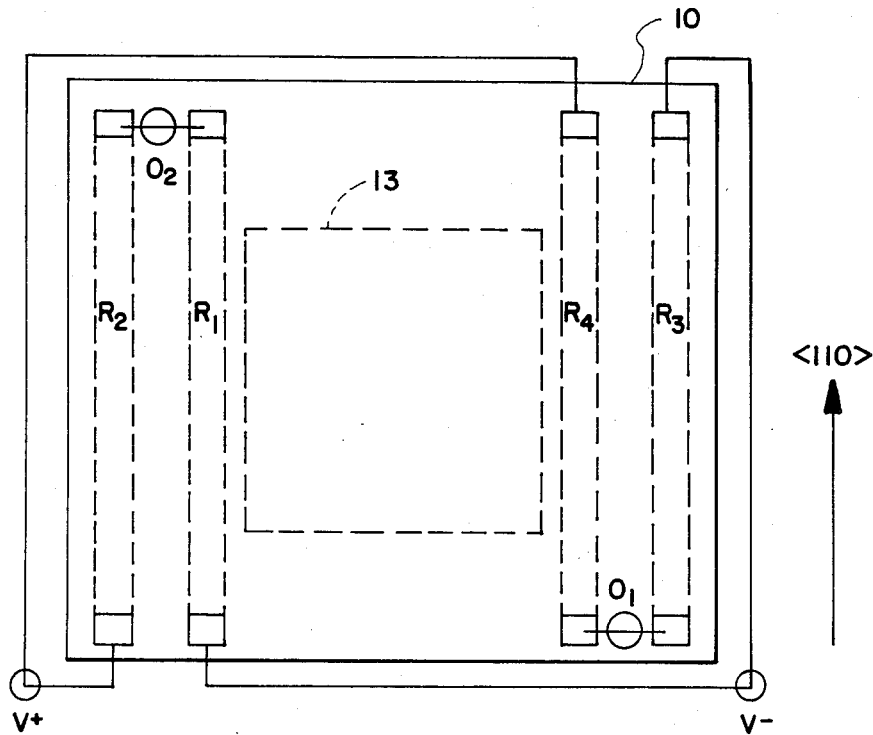
FIG. 1 is a top view of one embodiment of the piezoresistive pressure sensor.
Figure 1A:
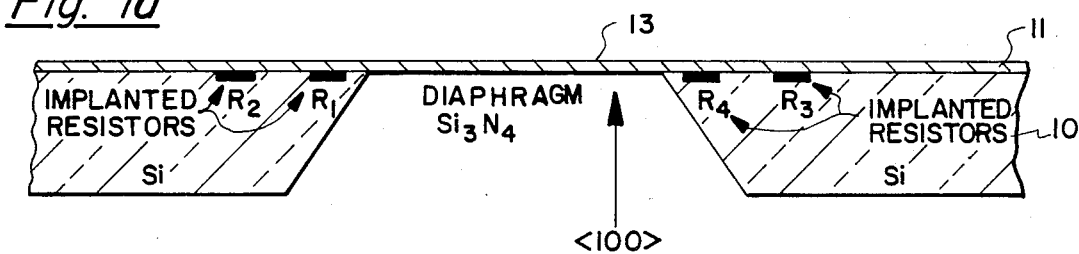
FIG. 1a is a crossection view of the sensor of FIG. 1.
Figure 2A:
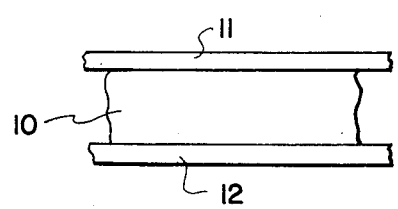
FIGS. 2a-e shows several process steps in the fabrication of the sensors.
Figure 2B:
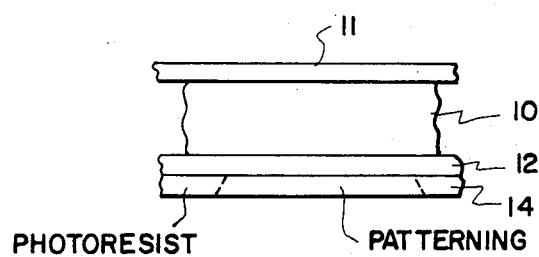
Figure 2C:
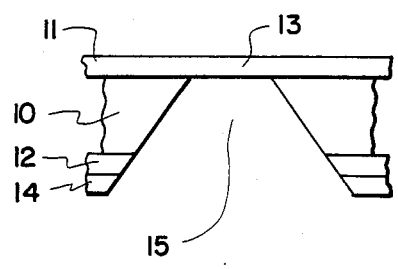
Figure 2D:
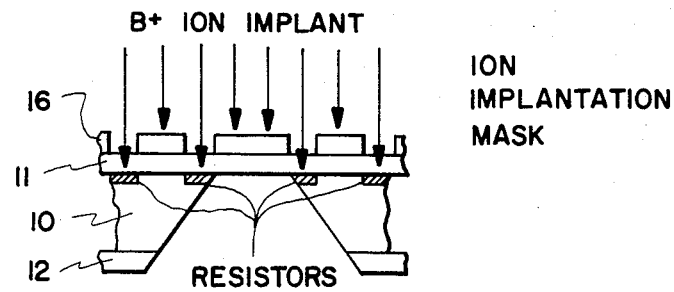
Figure 2E:
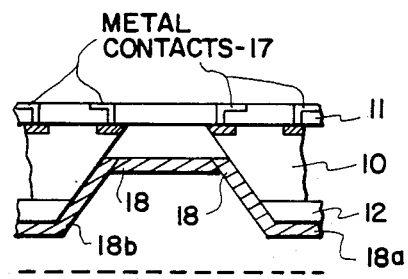

Referring now to FIGS. 1 and 1a, there is shown a single crystal silicon wafer 10 oriented in or near the <100> direction which has grown or deposited thereon a thin layer of silicon nitride ($Si_3N_4$) 11. The preferred crystal orientation is with the piezoresistor along the <110> direction as shown in FIG. 1. A similar layer 12 may be placed on the opposite surface of the silicon wafer (see FIG. 2a) for use in the fabrication. The thickness of silicon nitride layer 11 is chosen as desired for the diaphragm 13 and may be on the order of 0.001 mm (1.0 microns) thick. The non-silicon diaphragm material acts as a positive etch stop to improve the thickness control on the diaphragm. Referring now to FIGS. 2b and 2c it can be seen that a photoresist 14 is applied to the surface of the similar silicon nitride layer 12. After patterning and etching an opening through the layer 12, an anisotropic silicon etchant removes the silicon in the area 15. The layer 11 acts as a natural etch stop leaving the diaphragm 13 of silicon nitride. In this way very much smaller and thinner diaphragms can be fabricated. The diaphragm may be on the order of 0.125 mm across. The diaphragm itself need not be piezoresistive. In FIG. 2d an ion implantation mask 16 is provided on the surface of layer 11 and a boron ($B^+$) ion implant is made through the layer 11 into the upper surface of the silicon wafer 10 to form implanted resistors R1, R2, R3 and R4 which are shown most clearly in FIGS. 1 and 1a. The wafer is annealed at 500° C. The mask 16 is removed (FIG. 2e) and metal contacts 17 are made to extend from the implanted resistors to the surface by vias through the silicon nitride 11. A substrate 18b is anisotropically etched in reverse and coated with Au-Sn 18a which forms a eutectic bond with substrate 10 upon heating in vacuum forming reference cavity of an absolute pressure sensor. These resistors R1, R2, R3 and R4 are generally connected to form a bridge circuit configuration with electrical input at terminals V+ and V− and with output terminals at $O_1$ and $O_2$ as shown in FIG. 1.

Figure 3:
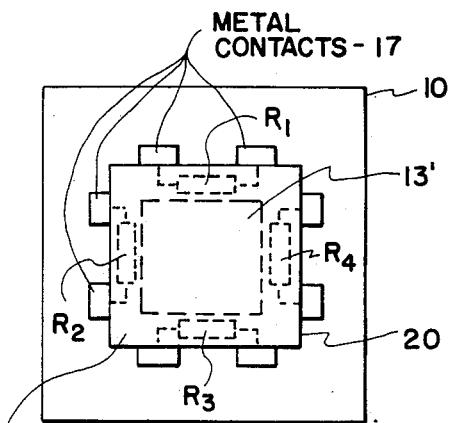
FIGS. 3 and 3a show a modification of FIG. 1.
Figure 3A:
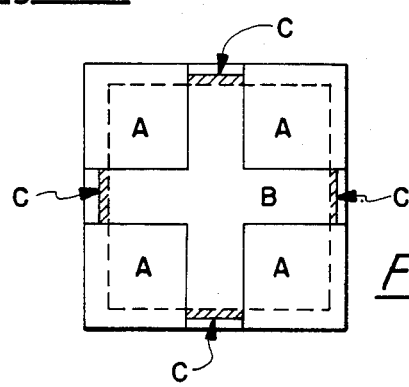
Figure 5:
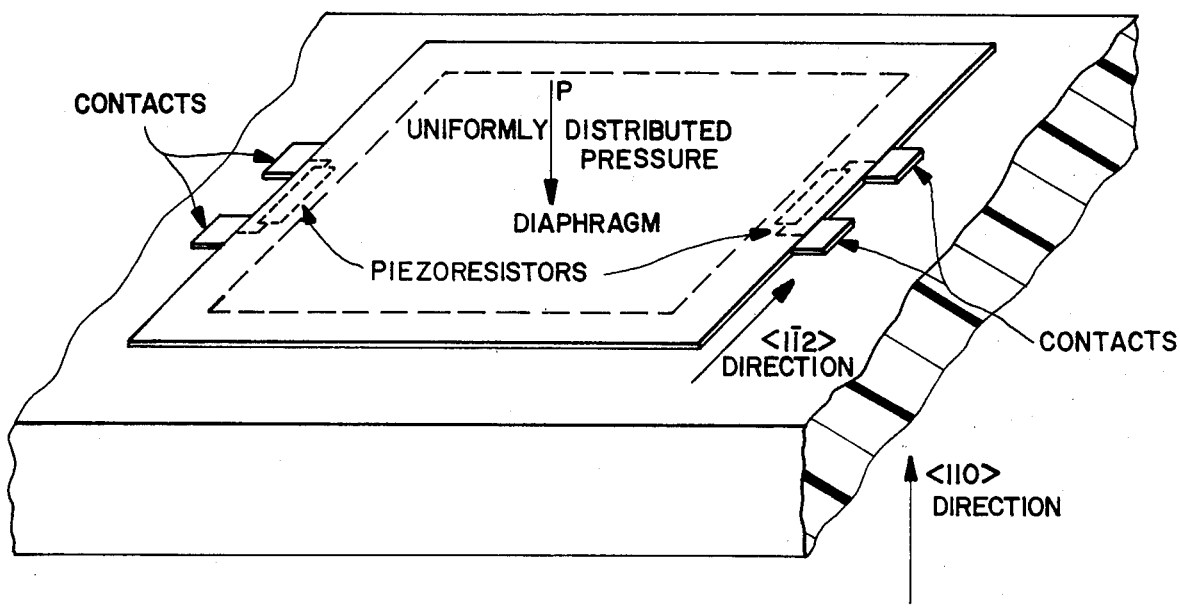
FIG. 5 shows another embodiment of the sensor where the silicon substrate is oriented in or near the <110> direction and the piezoresistors are along the <1$\bar{1}$2> direction.

A modification of FIG. 1 is shown in FIG. 3 in which the implanted resistors are on four sides of the diaphragm 13'. In this embodiment the $Si_3N_4$ layer extends only slightly larger than the diaphragm area 13' to envelop the resistors and end at perimeter 20. Another modification is shown in FIG. 3a in which the diaphragm may be fabricated with a rib B either thicker or thinner than the corner portion of the diaphragm area. This makes possible certain control over the stress on piezoresistor C to improve linearity or broaden the range of the sensor. Another embodiment is shown in FIG. 5 where the silicon substrate is oriented in or near the <110> direction and piezoresistors are along the <1$\bar{1}$2> direction as shown.

Figure 4:
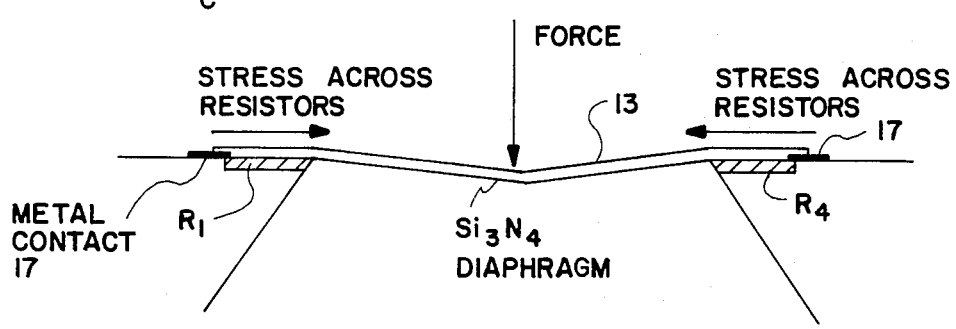
FIG. 4 shows a pressure deflected diaphragm and the resulting stress forces across the resistors.

The pressure sensor of FIG. 1 is a piezoresistive stress sensor in operation, and operation of the device is dependent on flexure of the diaphragm 13 as is shown schematically in FIG. 4. When the diaphragm is flexed it creates stress forces acting across the resistors R1 and R4 implanted into the piezoresistive silicon substrate. The resistors R2 and R3 being more remote from the edge 18 of the silicon are out of the effective range of the stress forces due to flexure of the diaphragm and these resistors are not affected appreciably.

While the $Si_3N_4$ diaphragm itself is not susceptable to changes in resistance created by flexure forces, the silicon substrate is piezoresistive. The stress in the single crystal silicon is used to sense the pressure induced stress in the diaphragm. The crystal lattice configuration of the silicon substrate dictates which stress components (shear, compression, or tension) will be affected in the resistor areas created by the boron ion implant. The stress forces across the resistors on the surface of the silicon wafer, created by flexure, results in a change in resistance.

The embodiments of the invention in which an exclusive property or right is claimed are defined as follows:

1. A piezoresistive pressure sensor comprising:
   a single crystal silicon substrate having a flat surface, said silicon substrate having piezoresistive properties;
   a thin film of silicon nitride formed on said surface;
   said silicon nitride film forming a diaphragm across an opening through said silicon substrate; and,
   ion implanted resistor means beneath said silicon nitride film in said silicon substrate at said flat surface adjacent said opening.

2. The sensor according to claim 1 in which said silicon nitride film has a thickness on the order of 1.0 microns.

3. The sensor according to claim 1 in which said silicon nitride diaphragm has a width on the order of 0.125 millimeter.

4. The sensor according to claim 1 in which said silicon substrate is oriented in or near the <100> direction.

5. The sensor according to claim 4 in which the piezoresistors are along the <110> direction.

6. The sensor according to claim 1 in which said silicon substrate is oriented in or near the <110> direction and the piezoresistors are along the <1$\bar{1}$2> direction.

7. The sensor according to claim 1 in which said opening is etched through said silicon substate from a surface opposite said flat surface to said silicon nitride film.

8. A piezoresistive pressure sensor fabricated on a piezoresistive silicon substrate and a non piezoresistive diaphragm comprising:
   a piezoresistive single crystal silicon substrate wafer, said waver having first and second opposing surfaces;
   a silicon nitride thin film formed on said first surface of said wafer;
   an opening etched from said second surface through said silicon wafer to said silicon nitride film whereby said film forms a diaphragm at said etched opening; and,
   ion implanted resistor means beneath said silicon nitride film in said silicon wafer adjacent said etched opening.

9. The sensor according to claim 8 in which said silicon nitride film has a thickness on the order of 1.0 microns.

10. The sensor according to claim 8 in which said silicon nitride diaphragm has a width on the order of 0.125 millimeter.

11. The sensor according to claim 8 in which said silicon substrate is oriented in or near the <100> direction.

12. The sensor according to claim 11 in which the piezoresistors are along the <110> direction.

13. The sensor according to claim 8 in which said silicon substrate is oriented in or near the <110> direction and piezoresistors are along the <1$\bar{1}$2> direction.

14. A method of preparing a piezoresistive pressure sensor comprising the steps of:
   providing a single crystal silicon substrate having a flat surface, said silicon substrate having piezoresistive properties;
   forming a thin film of silicon nitride on said surface;
   etching an opening through said silicon substrate from a surface opposite said flat surface to said silicon nitride film whereby said film forms a diaphragm at said etched opening; and,
   ion implanting resistor means in said silicon substrate at said flat surface adjacent said opening.

15. The method according to claim 14 in which said silicon nitride film has a thickness on the order of 1.0 microns.

16. The method according to claim 14 in which said silicon nitride diaphragm has a width on the order of 0.125 millimeter.

17. The method according to claim 14 in which said ion implanting is by boron ion implant through an ion implant mask.

18. The method according to claim 14 wherein the single crystal silicon substrate is oriented in or near the <100> direction.

19. The method according to claim 18 wherein the ion implanted resistor means are oriented along the <110> direction.

20. The method according to claim 14 wherein the single crystal silicon substrate is oriented in or near the <110> direction and the ion implanted resistor means are oriented along the <1$\bar{1}$2> direction.

* * * * *